US008256963B2

(12) United States Patent
Akiyama

(10) Patent No.: US 8,256,963 B2
(45) Date of Patent: Sep. 4, 2012

(54) ROLL MACHINING APPARATUS

(75) Inventor: Takanobu Akiyama, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 824 days.

(21) Appl. No.: 12/023,629

(22) Filed: Jan. 31, 2008

(65) Prior Publication Data

US 2008/0187266 A1 Aug. 7, 2008

(30) Foreign Application Priority Data

Feb. 2, 2007 (JP) ................................ 2007-023620

(51) Int. Cl.
  *F16C 32/06* (2006.01)
  *F16C 21/00* (2006.01)
  *F16C 23/00* (2006.01)
(52) U.S. Cl. ..................... 384/107; 384/101; 384/248
(58) Field of Classification Search .................. 384/100, 384/101, 107, 126–128, 247, 248, 256, 416–419, 384/462, 519, 546, 547, 556, 583, 590, 609; 82/147

See application file for complete search history.

(56) References Cited

U.S. PATENT DOCUMENTS

| 4,043,613 | A | * | 8/1977 | Freese ........................... 384/112 |
| 4,989,436 | A | * | 2/1991 | Setzer et al. .................... 72/247 |
| 5,447,375 | A | * | 9/1995 | Ochiai et al. ................... 384/100 |
| 6,328,475 | B1 | * | 12/2001 | Jager ............................ 384/107 |
| 2006/0145374 | A1 | * | 7/2006 | Baba et al. .................... 264/1.34 |

FOREIGN PATENT DOCUMENTS

| JP | 62258217 | * | 11/1987 |
| JP | 05138407 | * | 6/1993 |
| JP | 11-207503 | | 8/1999 |

OTHER PUBLICATIONS

English Abstract of JP-11-207503.

* cited by examiner

*Primary Examiner* — James Pilkington
(74) *Attorney, Agent, or Firm* — DLA Piper LLP (US)

(57) ABSTRACT

There is provided a roll machining apparatus for machining the surface of a roll, which can accurately support a roll by hydrostatic bearings while absorbing thermal expansion of the roll in the length direction, thus enhancing the machining precision. The roll machining apparatus can include a first hydrostatic radial bearing for receiving the radial load of a first spindle and rotatably supporting the first spindle, a hydrostatic thrust bearing for receiving the thrust load of the first spindle and limiting axial movement of the first spindle, a second hydrostatic radial bearing for receiving the radial load of a second spindle and rotatably supporting the second spindle, and a floating thrust having a thrust bearing for receiving the thrust load of the second spindle. The floating thrust selectively limits and permits axial movement of the thrust bearing.

15 Claims, 2 Drawing Sheets

ROLL MACHINING APPARATUS

BACKGROUND OF THE INVENTION

1. Field of the Invention

The present invention relates to a roll machining apparatus for machining the surface of a roll while supporting and rotating the roll in a horizontal position, and more particularly to a roll machining apparatus for machining a roll into a machined product which requires precision machining, such as a roll mold for the production of, for example, an optical film for use in a liquid crystal display or a lenticular lens for use in a rear projection device.

2. Background Art

A roll mold as described above requires fine, very high-precision machining. Therefore, when machining a roll into such a roll mold, it is necessary to precisely support the roll while suppressing shaking, displacement of the axis, etc. of the roll during its rotation. For this purpose, it is preferred to support spindles, supporting the both ends of the roll, by means of hydrostatic bearings.

However, when a spindle is supported by a hydrostatic thrust bearing which receives a thrust load, because of small bearing gap of the bearing, the bearing cannot absorb thermal expansion of a roll in the length direction e.g. due to a change in room temperature, especially when the roll has a large length, causing scuffing in the bearing.

Japanese Patent Laid-Open Publication No. 11-207503 discloses an apparatus for machining a crankshaft as a workpiece, in which the both ends of the workpiece are supported by two spindles which are supported by hydrostatic bearings both in the radical direction and in the thrust direction. The workpiece is not directly fixed to one of the spindles, but fixed at its one end to a piston provided in the one spindle. The workpiece is supported with a tensile force applied to the one end from the piston.

Though the disclosed method makes it possible to absorb thermal expansion of a workpiece in the length direction e.g. due to a change in room temperature, involves a complicated structure of the apparatus. In addition, since one end of the workpiece is not directly fixed to the spindle, but fixed to the spindle indirectly via the piston, the workpiece cannot be supported stably, and shaking, displacement of the axis, etc. of the workpiece during its rotation are likely to occur.

SUMMARY OF THE INVENTION

It is therefore an object of the present invention to provide a roll machining apparatus which can accurately support a roll by means of hydrostatic bearings while absorbing thermal expansion of the roll in the length direction e.g. due to a change in room temperature, thus enhancing the machining precision.

In order to achieve the object, the present invention provides a roll machining apparatus for machining the surface of a roll while supporting and rotating the roll in a horizontal position, said apparatus comprising: a first spindle to be detachably coupled to one end of the roll; a second spindle, disposed opposite to the first spindle on the same axis, to be detachably coupled to the other end of the roll; a first hydrostatic radial bearing for receiving the radial load of the first spindle and rotatably supporting the first spindle; a hydrostatic thrust bearing for receiving the thrust load of the first spindle and limiting axial movement of the first spindle; a second hydrostatic radial bearing for receiving the radial load of the second spindle and rotatably supporting the second spindle; and a floating thrust having a thrust bearing for receiving the thrust load of the second spindle, said thrust being capable of selectively limiting and permitting axial movement of the thrust bearing.

In a preferred embodiment of the present invention, the floating thrust includes: a housing having a cylinder chamber and a hole into which the thrust bearing is inserted, together with a bearing case, movably only in the axial direction; means for fixing the thrust bearing to the rear end of the second spindle; a piston, fitted movably into the hole, for pressing the thrust bearing in the axial direction by means of a pressurized fluid supplied to the cylinder chamber, and a switching valve for switching the directions of the flow of the pressurized fluid supplied to the cylinder chamber so as to selectively allow the piston to operate either to permit axial movement of the thrust bearing or to limit axial movement of the thrust bearing and fix it at a predetermined position.

According to the present invention, the first spindle of the two spindles that support the both ends of a roll is thus supported by the hydrostatic bearings both in the radial direction and in the thrust direction, while the second spindle is supported by the hydrostatic bearing in the radial direction and by the floating thrust, capable of selectively limiting axial movement of the second spindle, in the thrust direction. This enables a simple construction of the apparatus and, in addition, enables thermal expansion of the roll in the length direction, e.g. due to a change in room temperature, to be absorbed by the floating thrust while accurately supporting the roll with the hydrostatic radial bearings for the first and second spindles and with the hydrostatic thrust bearing for the first spindle, thus enhancing the processing precision.

The floating thrust is to fix the axial position of the second spindle at a predetermined position with respect to the spindle head body at the time of attaching or detaching a roll to or from the first and second spindles, and to perform initial setting of the axial position of the second spindle with respect to the spindle head body. Thus, the floating thrust does not necessarily use a hydrostatic thrust bearing. The use of a ball bearing for the floating thrust can further simplify the construction of the apparatus and can also reduce the cost.

DETAILED DESCRIPTION OF THE PREFERRED EMBODIMENTS

The present invention will now be described in detail with reference to the drawings.

Figure 1:
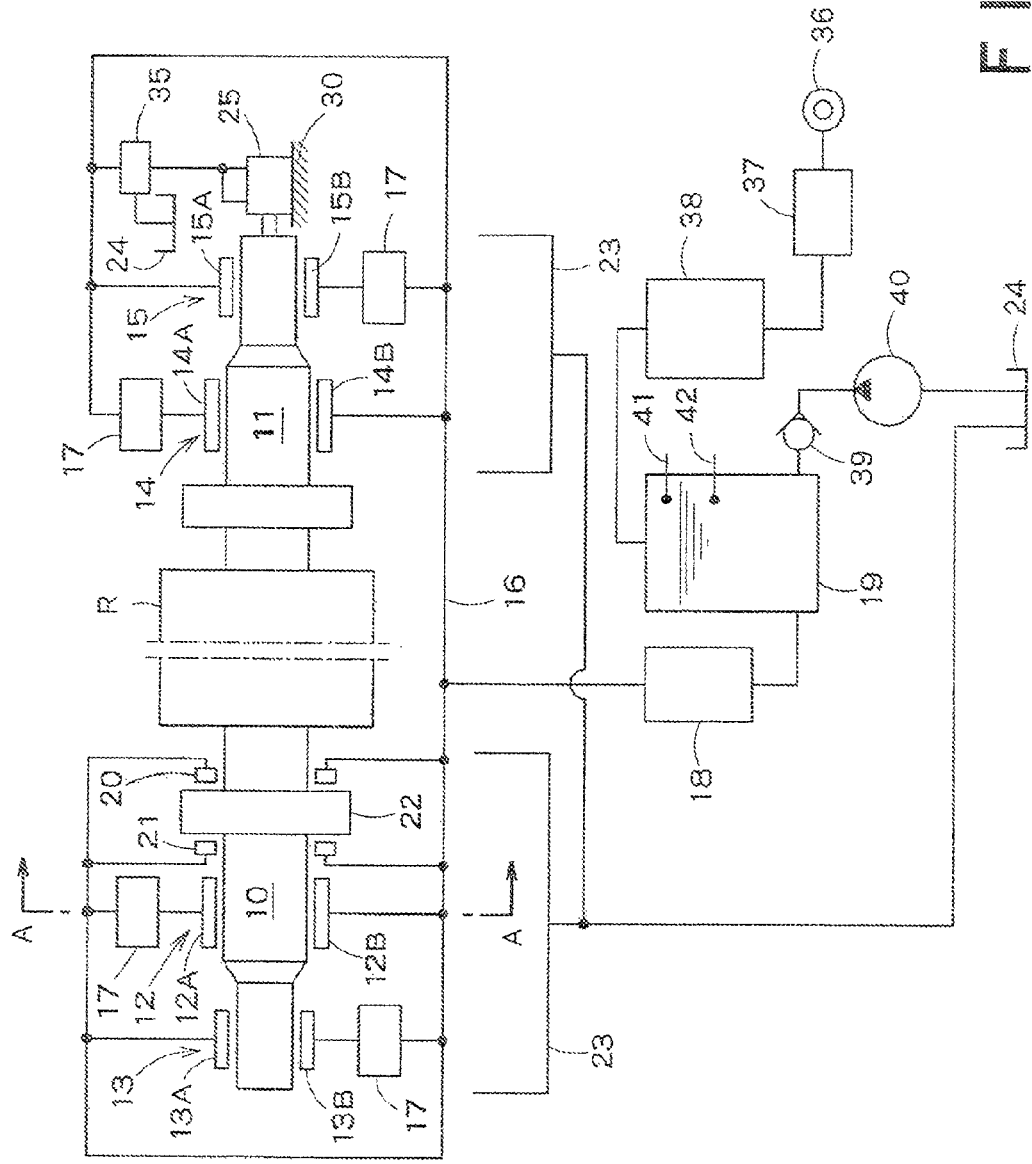
FIG. 1 is a schematic view showing the main portion of a roll machining apparatus according to the present invention.

FIG. 1 shows a roll machining apparatus according to an embodiment of the present invention. In FIG. 1, R denotes a roll to be machined, and reference numerals 10 and 11 denote a first spindle and a second spindle, respectively. The first and second spindles 10, 11 are disposed opposite to each other on the same horizontal axis, and detachably fix and support the both ends of the roll R and hold the roll in a horizontal position.

Figure 2:
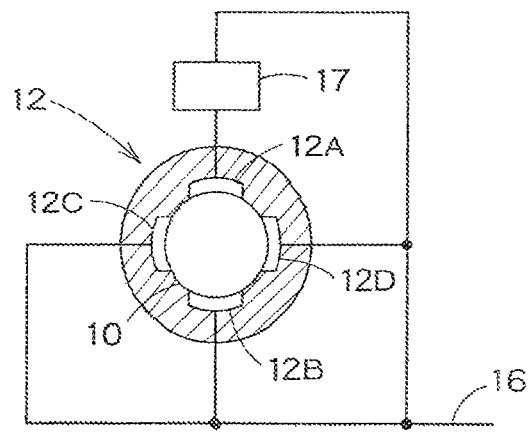
FIG. 2 is a cross-sectional view taken along the line A-A of FIG. 1.

The first spindles 10, on their front and rear sides with respect to the roll R, is rotatably supported by first hydrostatic radial bearing which includes hydrostatic pocket member 12, 13. The second spindles 11, on their front and rear sides with respect to the roll R, is rotatably supported by second hydrostatic radial bearing members which includes hydrostatic pocket members, 14, 15. The hydrostatic pocket member 12, for example, has hydrostatic pockets 12A, 12B in opposing vertical pair and hydrostatic pockets 12C, 12D in opposing lateral pairs, as shown in FIG. 2. The same holds for the other hydrostatic pocket members 13, 14, 15.

Of the hydrostatic pockets 12A, 12B, 12C, 12D, the hydrostatic pocket 12A, the upper pocket of the vertical pair to which a load is applied from the roll R, is provided with a constant-pressure ratio flow control valve 17, provide in a pressurized oil supply circuit 16, for changing the flow rate of a pressurized oil, supplied to the hydrostatic pocket 12A, in response to a change in the pressure in the hydrostatic pocket 12A so as to keep the bearing gap of the hydrostatic pocket 12A constant. The upper hydrostatic pocket 14A of the hydrostatic pocket member 14 on the front side of the second spindle 11 is also provided with the constant-pressure ratio flow control valve 17 provided in he pressurized oil supply circuit 16.

With reference to the hydrostatic pocket members 13, 15 on the rear sides of the spindles 10, 11 on the other hand, the lower hydrostatic pockets 13B, 15B are each provided with the constant-pressure ratio flow control valve 17 in the pressurized oil supply circuit 16. The pressurized oil supply circuit 16 is connected via a temperature regulating unit 18 to an accumulator tank 19 which is the source of supply of the pressurized oil.

The hydrostatic pockets (reference numerals omitted) other than the hydrostatic pockets 12A, 14A, 13B, 15B of the hydrostatic pocket members 12, 13, 14, 15 are connected via the temperature regulating unit 18 to the accumulator tank 19, the source of supply of the pressurized oil, without passing through the constant-pressure ratio flow control valve 17.

Reference numerals 20, 21 denote hydrostatic thrust bearings for the first spindle 10. The hydrostatic thrust bearings 20, 21 have pairs of opposing hydrostatic pockets on the opposite surfaces of a flange 22 provided in the first spindle 10. Each hydrostatic pocket is connected to the accumulator tank 19 via the pressurized oil supply circuit 16 and the temperature regulating unit 18. Reference numeral 23 denotes a drain for returning the oil, which has flowed from the hydrostatic bearings 12-15, 20, 21, to a tank 24.

Figure 3:
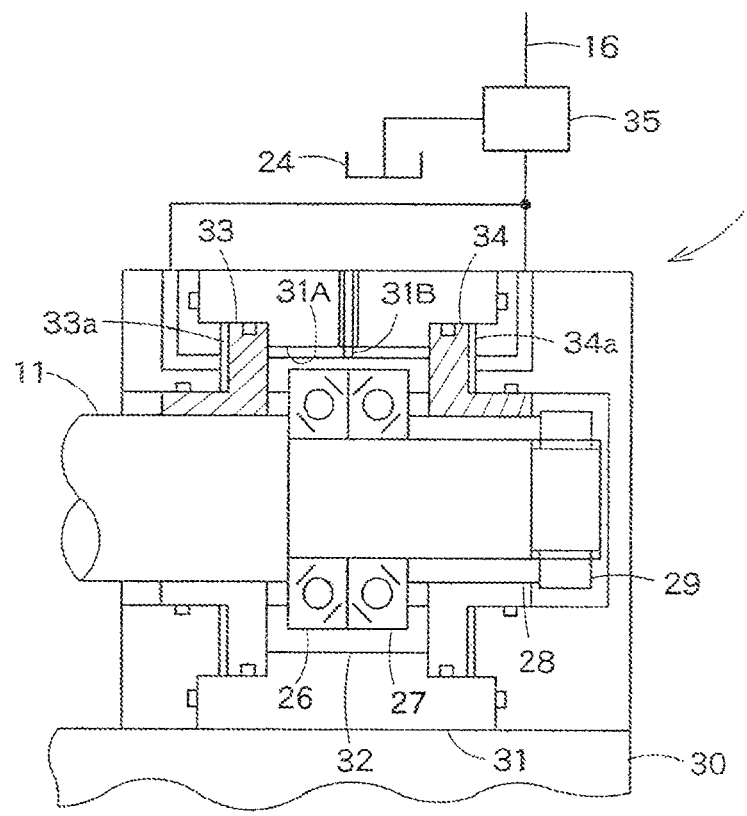
FIG. 3 is an enlarged vertical sectional view showing the details of the floating thrust shown in FIG. 1.

The second spindle 11 is provided, at its rear end (right end in FIG. 1), with a floating thrust 25. As shown in FIG. 3, the floating thrust 25 has ball bearings 26, 27 as thrust bearings, mounted to the rear end of the second spindle 11 by a nut 29 with a spacer 28 interposed between the bearings and the nut. The outer races of the ball bearings 26, 27 are fitted, via a bearing case 32, into a hole 31A of a housing 31. A guide pin 31B is inserted into the housing 31 in the radial direction such that the guide pin 31B is contact with peripheral surface of the bearing case 32. The bearing case 32 is supported and movable only in the axial direction by means of the guide pin 31B. The housing 31 is mounted to a spindle head body 30 (only partly shown) that rotatably supports the second spindle 11 with the hydrostatic pocket members 14, 15.

In the housing 31 are formed cylinder chambers 33a, 34a. Pistons 33, 34 for pressing the bearing case 32 backward and forward are provided in the housing 31. With the step portions in front of and behind the hole 31A, the forward movements of the pistons 33, 34 are limited, while they can each move backward a predetermined distance. The cylinder chambers 33a, 34a in the back sides of the pistons 33, 34, are connected to the pressurized oil supply circuit 16 and to the tank 24 selectively via a switching valve 35. By connecting the pistons 33, 34 to the pressurized oil supply circuit 16, the pistons 33, 34 are pressed by the pressurized oil to the limited forward movement positions, thereby fixing the axial position of the ball bearings 26, 27 via the bearing case 32. On the other hand, by connecting the pistons 33, 34 to the tank 24, the pressures on the back sides of the pistons 33, 34 are released so as to permit axial movement of the ball bearings 26, 27.

Returning to FIG. 1, to the accumulator tank 19 is connected a receiver tank 38 for storing high-pressure air from a pressure-increasing valve 37 which increases the pressure of pressurized air from a pressurized air source 36, e.g. factory air, so that the accumulator tank 19 can be given a pressure necessary for the hydrostatic pocket members 12-15, 20, 21.

Further, a pump 40 is connected via a check valve 39 to the accumulator tank 19. The start-up and stop of the pump 40 is controlled with upper and lower liquid level indicators 41, 42, provided in the accumulator tank 19, so as to store not less than a predetermined amount of pressurized oil in the accumulator tank 19. A rotational drive mechanism for the first and second spindles 10, 11, and an axial movement mechanism for the first spindle 10 or the second spindle 11, provided for attachment/detachment of the roll R, have no direct relation with the present invention and hence a detailed description thereof is herein omitted.

The operation of the roll machining apparatus will now be described.

Prior to attaching the roll R to the first and second spindles 10, 11, the back sides of the pistons 33, 34 are connected to the pressurized oil supply circuit 16 by the switching valve 35, so that the pressurized oil supplied presses the pistons 33, 34 against the step portions in front of and behind the hole 31A as shown in FIG. 3, thereby fixing the ball bearings 26, 27 with respect to the housing 31 and fixing the axial position of the second spindle 11 with respect to the spindle head body 30.

Next, the both ends of the roll R are attached and fixed to the front ends of the first and second spindles 10, 11. After the attachment of the roll R, the load of the roll R acts on the spindles 10, 11 whereby the bearing gaps of the lower hydrostatic pockets 12B, 14B of the front hydrostatic pocket members 12, 14 are becoming smaller, whereas the bearing gaps of the upper hydrostatic pockets 12A, 14A are becoming larger. On the contrary, in the case of the rear hydrostatic pocket members 13, 15, the bearing gaps of the upper hydrostatic pockets 13A, 15A are becoming smaller, whereas the bearing gaps of the lower hydrostatic pockets 13B, 15B are becoming larger.

The pressure of the pressurized oil in a hydrostatic picket increases as the bearing gap decreases, and conversely, the pressure of the pressurized oil in a hydrostatic picket decreases as the bearing gap increases. However, the pressurized oil is supplied from the accumulator tank 19 to the hydrostatic pockets 12A, 14A, 13B, 15B, whose bearing gaps are becoming larger, via the respective constant-pressure ratio flow control valves 17. The flow rate the pressurized oil supplied to each of the hydrostatic pockets 12A, 14A, 13B, 15B changes in response to a change in the pressure of the pressurized oil in the hydrostatic pocket, whereby the bearing gap of each of the hydrostatic pockets 12A, 14A, 13B, 15B is kept constant.

Because the bearing gaps of the hydrostatic pockets 12A, 14A, 13B, 15B, whose bearing gaps are to change by the load of the roll R, are thus kept constant, the bearing gaps of their opposing counterparts of the vertical pairs, i.e. the hydrostatic pockets 12B, 14B, 13A, 15A, are also kept constant. A change in the bearing gap of each hydrostatic pocket due to the load of the roll R can thus be suppressed. Accordingly, even when rotating the spindles 10, 11 at a high speed by means of a not-shown rotational drive mechanism, a difference in the rise of temperature in each hydrostatic pocket can be made small. Deformation of the spindles 10, 11 can therefore be suppressed, making it possible to accurately support the roll R and machine it with enhanced precision.

Further according to this embodiment, the pressurized oil is supplied to the hydrostatic bearings 12-15, 20, 21 from the accumulator tank 19 to which a stable pressure is given by the receiver tank 38. This can suppress pulsing motion as will occur when supplying a pressurized oil directly from a pump, making it possible to accurately and stably support and rotate the roll R. This can also enhance the machining precision for the roll R.

Furthermore, not less than a predetermined amount of pressurized oil is stored in the accumulator tank 19 through control of the start-up and stop of the pump 40 with the liquid level indicators 41, 42. This enables supply of the pressurized oil to the hydrostatic pockets even upon a power failure, thus preventing damage, such as scuffing, to the bearings.

After attaching the roll R to the spindles 10, 11 in the above-described manner and before rotating the spindles 10, 11 and starting machining of the roll R, the switching valve 35 for the floating thrust 25 is switched to open the back sides of the pistons 33, 34 to the tank 24. This allows the ball bearings 26, 27 to move with respect to the housing 31 in the axial direction when the roll R expands or contracts e.g. due to a change in room temperature, thus allowing the second spindle 11 to move in the axial direction. Accordingly, no excessive load will be applied to the hydrostatic thrust bearings 20, 21 of the first spindle 10. This not only prevents damage, such as scuffing, to the bearings but also makes it possible to accurately and stably support and rotate the roll R, thereby enhancing the machining precision for the roll k.

In this embodiment, of the hydrostatic pockets 12A, 12B, etc. which are opposing hydrostatic pockets in the vertical pairs on which the load of the roll R acts, only the hydrostatic pockets 12A, etc., whose bearing gaps increase by the load of the roll R, are connected to the respective constant-pressure ratio flow control valves 17 so as to keep the respective bearing gaps constant. However, it is also possible to connect the constant-pressure ratio flow control valves 17 to either the hydrostatic pockets 12B, etc. whose bearing gaps decrease or all of the vertical pairs of hydrostatic pockets, the hydrostatic pockets 12A, 12B, etc. It is also possible not to use the constant-pressure ratio flow control valves 17. Further, though in this embodiment the pressurized oil is supplied from the accumulator tank 19 to the hydrostatic pocket member 12, etc. via the temperature regulating unit 18, this is not limiting of the present invention. Thus, it is possible to omit the temperature regulating unit 18, to change the accumulator tank 19 to the pump 40, or to supply the pressurized oil directly from the pump 40.

In this embodiment the ball bearings 26, 27 are used for the floating thrust 25. The floating thrust 25 is to fix the axial position of the second spindle 11 at a predetermined position with respect to the spindle head body 30 at the time of attaching or detaching the roll R to or from the first and second spindles 10, 11, and to perform initial setting of the axial position of the second spindle 11 with respect to the spindle head body 30. It is therefore also possible to use, instead of the ball bearings 26, 27, various other types of thrust bearings, such as hydrostatic bearings or plain bearings.

Further, though in this embodiment the pressurized oil in the pressurized oil supply circuit 16 for the hydrostatic bearings is used to fix the ball bearings 26, 27 of the floating thrust 25 to the spindle head body 30, it is also possible to use pressurized air. Furthermore, in this embodiment the ball bearings 26, 27 are designed to be movable forward and backward by means of the pistons 33, 34 in order to respond to expansion and contraction of the roll R. However, in the case where due to machining conditions, the roll R is subject to only one of expansion and contraction, it is possible to design the pistons 33, 34 to be movable only backward or only forward. It will be appreciated by those skilled in the art that other changes or modifications could be made to the embodiments described above without departing from the inventive concept thereof. While the present invention can be advantageously applied to a roll machining apparatus for machining a roll into a machined product which requires precision machining, such as a roll mold for the production of, for example, an optical film for use in a liquid crystal display or a lenticular lens for use in a rear projection device, the present invention is applicable broadly to a roll machining apparatus for machining the surface of a roll while supporting and rotating the roll in a horizontal position with a first spindle and a second spindle disposed opposite to each other.

What is claimed is:

1. A roll machining apparatus for machining the surface of a roll while supporting and rotating the roll in a horizontal position, the apparatus comprising:
   a first spindle configured to be detachably coupled to a first end of the roll;
   a second spindle, disposed opposite to the first spindle on the same axis, configured to be detachably coupled to a second end of the roll;
   a first hydrostatic radial bearing configured to receive a radial load of the first spindle and configured to rotatably support the first spindle;
   a hydrostatic thrust bearing configured to receive a thrust load of the first spindle and configured to limit axial movement of the first spindle;
   a second hydrostatic radial bearing configured to receive a radial load of the second spindle and configured to rotatably support the second spindle;
   a floating thrust comprising:
      a thrust bearing comprising an outer race having two sides and a bearing case, the thrust bearing configured to receive a thrust load of the second spindle:
      a housing comprising a cylinder chamber, a hole configured to receive the thrust bearing and comprising a step portion formed within the hole, and a bearing case, movable only in an axial direction;
      a spacer and nut configured to fix the thrust bearing to the rear end of the second spindle;
      a pair of pistons, each of the pair of pistons comprising a cylinder chamber formed on a back side of the piston, one of the pair of pistons being disposed on each side of the outer race of the thrust bearing, each of the pair of pistons fitted movably into the hole, the pair of pistons configured to press the thrust bearing in an axial direction when a pressurized fluid is supplied to the cylinder chambers;
      wherein the floating thrust is configured to selectively operate in a first mode and a second mode, the floating thrust configured to limit axial movement of the thrust bearing to fix the position of the second spindle in an axial direction in the first mode, and the floating thrust configured to permit the thrust bearing to displace freely according to an expansion and/or contraction of the roll in the second mode; and
      a switching valve configured for switching a flow path of the pressurized fluid supplied to the cylinder chamber so as to selectively allow each piston to operate either to permit axial movement of the thrust bearing or to limit axial movement of the thrust bearing and fix it at a predetermined position, wherein the step portion in the hole is configured to limit forward movement of each piston to a forward limit position, and wherein each piston is configured to hold the bearing case of the thrust bearing to fix the thrust bearing at the predetermined position when each piston is in its forward limit position.

2. The roll machining apparatus according to claim 1, further comprising a guide pin fitted into the housing, the guide pin being configured to contact a peripheral surface of the bearing case of the thrust bearing to allow the thrust bearing to move only in an axial direction.

3. The roll machining apparatus according to claim 1, wherein the thrust bearing of the floating thrust comprises a ball bearing.

4. The roll machining apparatus according to claim 1, wherein the first hydrostatic radial bearing comprises two hydrostatic pocket members which respectively support a front portion and a rear portion of the first spindle, each hydrostatic pocket member comprising four hydrostatic pockets in vertical and lateral pairs.

5. The roll machining apparatus according to claim 4, wherein a pressurized oil is supplied via a flow rate regulating means to hydrostatic pockets of the first hydrostatic radial bearing comprising bearing gaps that are increasing or to hydrostatic pockets of the first hydrostatic radial bearing comprising bearing gaps that are decreasing due to the load of the roll.

6. The roll machining apparatus according to claim 5, wherein:
the pressurized oil is supplied to the hydrostatic pocket member of the first hydrostatic radial bearing which is configured to support the front portion of the first spindle, the pressurized oil being supplied via the flow rate regulating means to the upper hydrostatic pocket such that the bearing gap is kept constant; and
the pressurized oil is supplied to the hydrostatic pocket member of the first hydrostatic radial bearing which is configured to support the rear portion of the first spindle, the pressurized oil being supplied via the flow rate regulating means to the lower hydrostatic pocket such that the bearing gap is kept constant.

7. The roll machining apparatus according to claim 6, further comprising a pressurized oil supply circuit for supplying the pressurized oil to the first hydrostatic radial bearing, the second hydrostatic radial bearing, and the hydrostatic thrust bearing, the pressurized oil supply circuit comprising an accumulator configured to store not less than a predetermined amount of the pressurized oil.

8. The roll machining apparatus according to claim 7, wherein the pressurized oil supply circuit further comprises a temperature regulating unit configured to regulate the temperature of the pressurized oil.

9. The roll machining apparatus according to claim 5, further comprising a pressurized oil supply circuit for supplying the pressurized oil to the first hydrostatic radial bearing, the second hydrostatic radial bearing, and the hydrostatic thrust bearing, the pressurized oil supply circuit comprising an accumulator configured to store not less than a predetermined amount of the pressurized oil.

10. The roll machining apparatus according to claim 9, wherein the pressurized oil supply circuit further comprises a temperature regulating unit configured to regulate the temperature of the pressurized oil.

11. The roll machining apparatus according to claim 1, wherein the second hydrostatic radial bearing has two hydrostatic pocket members which respectively support a front portion and a rear portion of the second spindle, each hydrostatic pocket member comprising four hydrostatic pockets in vertical and lateral pairs.

12. The roll machining apparatus according to claim 11, wherein a pressurized oil is supplied via a flow rate regulating means to hydrostatic pockets of the second hydrostatic radial bearing comprising bearing gaps that are increasing or hydrostatic pockets of the second hydrostatic radial bearing comprising bearing gaps that are decreasing due to the load of the roll.

13. The roll machining apparatus according to claim 12, wherein:
the pressurized oil is supplied to the hydrostatic pocket member of the second hydrostatic radial bearing which is configured to support the front portion of the second spindle, the pressurized oil being supplied via the flow rate regulating means to the upper hydrostatic pocket such that the bearing gap is kept constant; and
the pressurized oil is supplied to the hydrostatic pocket member of the second hydrostatic radial bearing which is configured to support the rear portion of the second spindle, the pressurized oil being supplied via the flow rate regulating means to the lower hydrostatic pocket such that the bearing gap is kept constant.

14. The roll machining apparatus according to claim 1, wherein the hydrostatic thrust bearing comprises a plurality of hydrostatic pockets disposed on two sides of a flange portion formed in the first spindle, the hydrostatic pockets and the flange portion forming bearing gaps into which a pressurized oil is supplied.

15. The roll machining apparatus according to claim 1, wherein the roll is to be machined into a roll mold for use in the molding of an optical film or a lenticular lens.

* * * * *